(12) United States Patent
Tsouri et al.

(10) Patent No.: US 8,223,882 B2
(45) Date of Patent: Jul. 17, 2012

(54) JOINT CONSTELLATION MULTIPLE ACCESS

(75) Inventors: Gil Rafael Tsouri, Moshav Qelahim (IL); Dov Wulich, Metar (IL)

(73) Assignee: Signext Wireless Ltd., Yavne (IL)

( * ) Notice: Subject to any disclaimer, the term of this patent is extended or adjusted under 35 U.S.C. 154(b) by 925 days.

(21) Appl. No.: 12/089,071

(22) PCT Filed: Oct. 5, 2006

(86) PCT No.: PCT/IL2006/001166
§ 371 (c)(1),
(2), (4) Date: Nov. 4, 2008

(87) PCT Pub. No.: WO2007/039908
PCT Pub. Date: Apr. 12, 2007

(65) Prior Publication Data
US 2009/0135926 A1 May 28, 2009

Related U.S. Application Data

(60) Provisional application No. 60/724,593, filed on Oct. 6, 2005.

(51) Int. Cl.
*H04L 27/00* (2006.01)

(52) U.S. Cl. ........ 375/295; 375/260; 375/262; 375/267; 375/299; 370/480; 370/498

(58) Field of Classification Search .................. 375/260, 375/262, 267, 295, 299, 341; 370/480, 498
See application file for complete search history.

(56) References Cited

U.S. PATENT DOCUMENTS

| 2004/0209570 | A1 | 10/2004 | Fiore |
| 2005/0018787 | A1 | 1/2005 | Saed |
| 2005/0068918 | A1* | 3/2005 | Mantravadi et al. .......... 370/328 |

OTHER PUBLICATIONS

Gill R. Tsouri, et al., "Wireless channel access through jointly formed signal constellations", The 17th Annual IEEE Int. Symp. on Persoal, Indoor and Mobile Radio Communications (PIMRC'06).
T.S. Rappaport, "Multiple access technique for wireless communications", Wireless Communications Principles and Practice, Chapter 8, pp. 395-437, Dec. 2001.
Verdu, "Multiuser Detection", Cambridge University Press, Aug. 1998, Chapter four, pp. 154-213.
Larsson and Vojcic, "Cooperative transmit diversity based on superposition modulation", IEEE Communication Letters, (9:9), Sep. 2005, pp. 778-780.
Schwartz, et al., "Communication system and techniques", McGraw-Hill, New York, 1966, Chapter 9, pp. 343-415.
Schwartz, et al., "Communication system and techniques", McGraw-Hill, New York, 1966, Chapter 11, pp. 490-497.
U.S. Appl. No. 60/724,593, filed Oct. 6, 2005.

\* cited by examiner

*Primary Examiner* — Curtis Odom
(74) *Attorney, Agent, or Firm* — Fish & Richardson P.C.

(57) ABSTRACT

A method for communication includes defining N respective symbol constellations in a signal space for N transmitters (24), N(2, subject to a predetermined power constraint, so as to produce a joint constellation including superpositions of symbols selected from the N symbol constellations. Data is transferred from the N transmitters by simultaneously transmitting from the N transmitters N respective symbols selected respectively from the N symbol constellations. A composite symbol including a superposition of the N transmitted symbols is received. The received composite symbol is demodulated using the joint constellation so as to reconstruct the data transferred from the N transmitters.

57 Claims, 5 Drawing Sheets

JOINT CONSTELLATION MULTIPLE ACCESS

CROSS REFERENCE TO PRIOR APPLICATIONS

This application is the U.S. national phase of International Application No. PCT/IL2006/001166 filed Oct. 5, 2006, which claims priority from U.S. Provisional Application No. 60/724,593, filed Oct. 6, 2005. The disclosures of both application are incorporated herein by reference in their entirety. The International Application was published in English on Apr. 12, 2007 as WO/2007/039908 A1 under PCT Article 21(2).

FIELD OF THE INVENTION

The present invention relates generally to communication systems, and particularly to methods and systems for multiple access communications.

BACKGROUND OF THE INVENTION

Many communication applications use multiple access, i.e., the ability to coordinate the use of a communication channel or medium among multiple transmitters. Several multiple access methods and systems are known in the art. For example, time division multiple access (TDMA) systems allocate different time slots to different transmitters. Frequency division multiple access (FDMA) systems assign a different frequency channel to each transmitter. In code division multiple access (CDMA) systems, each transmitter modulates its data with a different pseudorandom code or sequence, enabling the receiver to differentiate between the transmitters. Combinations of TDMA, FDMA and/or CDMA are also known.

Another multiple access method is described in U.S. Patent Application Publication 2004/0209570 A1, whose disclosure is incorporated herein by reference. A channel encoder converts alphabetic symbols into a pre-selected geometrical representation of a hexagonal lattice known as a symbol constellation. A channel decoder converts the received symbol constellation into a replication of the alphabetic symbols. Each user has a specially defined symbol set that allows a linear-complexity decoding operation.

Some multiple access receivers use multiuser detection methods for demodulating the mutually interfering signals originating from different transmitters. Such detection methods are described, for example, by Verdú in "Multiuser Detection," Cambridge University Press, August, 1998, chapter four, pages 154-213, which is incorporated herein by reference.

Another multiple access technique is referred to as cooperative transmit diversity and is described, for example, by Larsson and Vojcic in "Cooperative Transmit Diversity Based on Superposition Modulation," IEEE Communication Letters, (9:9), September, 2005, pages 778-780, which is incorporated herein by reference. The paper describes a method in which a transmitter relays the information of another transmitter in addition to its own information, in order to improve its error performance.

SUMMARY OF THE INVENTION

Embodiments of the present invention provide improved methods and systems for transferring data from multiple transmitters to a receiver. These multiple access methods and systems are referred to herein as joint constellation multiple access (JCMA). In a JCMA system that includes N transmitters, $N \geq 2$, each transmitter is assigned a respective symbol constellation, also called a transmitter constellation, which is defined in a given signal space. A joint constellation, to be used by the receiver, is defined based on the N transmitter constellations. The joint constellation comprises superpositions (i.e., vector sums) of N symbols, respectively selected from the N symbol constellations. The joint constellation is designed so as to maximize signal space distances among its symbols while meeting a predetermined power constraint.

The N transmitters transfer data to the receiver by transmitting N respective symbol streams. The symbols in the streams are selected respectively from the N transmitter constellations and are transmitted simultaneously and on the same frequency by all the N transmitters. The receiver thus receives a stream of composite symbols, each comprising a superposition of the corresponding N transmitted symbols. The receiver demodulates the received composite symbol using the joint constellation so as to reconstruct the data transferred from each of the N transmitters.

Unlike some known multiple access methods, such as TDMA, in which the system performance typically deteriorates as the number of transmitters increases, in JCMA the demodulation performance of the receiver often improves as the number of transmitters grows. In many cases, particularly when the output power of the transmitters is constrained, JCMA has inherent performance advantages over known multiple access methods, which result in improved error performance and increased spectral efficiency. This performance gain can be used to increase the communication range of the system and/or to reduce transmitter power. Several exemplary scenarios are described herein, and simulated performance results are provided.

In some embodiments, JCMA can be combined with other multiple access methods such as TDMA, FDMA and CDMA, to further improve the efficient use of the communication channel or medium.

There is therefore provided, in accordance with an embodiment of the present invention, a method for communication, including:

defining N respective symbol constellations in a signal space for N transmitters, $N \geq 2$, subject to a predetermined power constraint, so as to produce a joint constellation including superpositions of symbols selected from the N symbol constellations;

transferring data from the N transmitters by simultaneously transmitting from the N transmitters N respective symbols selected respectively from the N symbol constellations;

receiving a composite symbol including a superposition of the N transmitted symbols; and demodulating the received composite symbol using the joint constellation so as to reconstruct the data transferred from the N transmitters.

In an embodiment, defining the N symbol constellations includes applying an optimization process responsively to the power constraint. Additionally or alternatively, applying the optimization process may include repeatedly generating random sets of the N transmitter constellations, evaluating a minimum Euclidean distance ($D_{MIN}$) value of the produced joint constellation, and outputting a set of N transmitter constellations and joint constellation corresponding to a largest $D_{MIN}$ value.

In another embodiment, applying the optimization process includes evaluating Hamming distances of the produced joint constellation, and outputting the set of N transmitter constellations and the joint constellation includes verifying that the joint constellation has a minimal Hamming distance larger than a predefined threshold.

In yet another embodiment, defining the N symbol constellations includes maximizing distances in the signal space among joint constellation symbols of the joint constellation.

In still another embodiment, defining the N symbol constellations includes defining for a first transmitter a first symbol constellation having a first number of constellation symbols, and defining for a second transmitter a second symbol constellation having a second number of constellation symbols different from the first number, so as to cause the first and second transmitters to transmit the data at different respective data rates.

In an embodiment, defining the N symbol constellations includes defining first and second power levels of respective first and second symbol constellations of first and second transmitters, so as to cause first and second symbols transmitted respectively by the first and second transmitters to be received at different power levels.

In another embodiment, the power constraint includes a maximum value set to at least one of an instantaneous power and an average power of each of the N transmitters.

In yet another embodiment, transferring the data from the N transmitters includes adjusting at least one of phases, magnitudes and timing offsets of the symbols transmitted from the N transmitters so as to produce the composite symbol.

In yet another embodiment, demodulating the received composite symbol includes selecting a symbol from among joint constellation symbols of the joint constellation responsively to the received composite symbol using a maximum likelihood (ML) detector. Additionally or alternatively, demodulating the received composite symbol includes approximating the ML detector based on a symmetry of the joint constellation.

In an embodiment, the method includes modifying at least one of the joint constellation and the N symbol constellation responsively to a failure of one or more of the N transmitters. Additionally or alternatively, the method may include periodically redefining the N symbol constellations by re-assigning the symbols among the N symbol constellations.

There is additionally provided, in accordance with an embodiment of the present invention, a method for communication, including:

defining a first plurality of symbol constellations in a signal space for a respective first plurality of transmitters, so as to produce a first joint constellation including superpositions of symbols selected from the first symbol constellations;

defining a second plurality of symbol constellations in the signal space for a respective second plurality of transmitters, so as to produce a second joint constellation including superpositions of symbols selected from the second symbol constellations; and transferring data from the first and second pluralities of transmitters by:

simultaneously transmitting from the first plurality of transmitters first respective symbols selected respectively from the first plurality of symbol constellations;

simultaneously transmitting from the second plurality of transmitters second respective symbols selected respectively from the second plurality of symbol constellations;

multiplexing the first and second symbols over a common communication channel using a multiple access method;

receiving first and second composite symbols including respective superpositions of the first and second transmitted symbols; and demodulating the first and second received composite symbols using the first and second joint constellations so as to reconstruct the data transferred from the first and second pluralities of transmitters.

In an embodiment, the multiple access method includes a frequency division multiple access (FDMA) method, and multiplexing the first and second symbols includes transmitting the first and second symbols on respective different first and second carrier frequencies.

In another embodiment, the multiple access method includes a time division multiple access (TDMA) method, and multiplexing the first and second symbols includes transmitting the first and second symbols in respective different first and second time slots.

In yet another embodiment, the multiple access method includes a code division multiple access (CDMA) method, and multiplexing the first and second symbols includes transmitting the first and second symbols using respective different first and second CDMA sequences.

In still another embodiment, the multiple access method includes orthogonal frequency division multiplexing (OFDM), and multiplexing the first and second symbols includes transmitting the first and second symbols on respective first and second OFDM sub-carriers of an OFDM signal.

There is further provided, in accordance with an embodiment of the present invention, a method for communication, including:

defining N respective symbol constellations in a signal space for N transmitters, $N \geq 2$, so as to produce a joint constellation including superpositions of symbols selected from the N symbol constellations, wherein at least one of the N symbol constellations is not a rotated and scaled replica of any other of the N symbol constellations;

transferring data from the N transmitters by simultaneously transmitting from the N transmitters N respective symbols selected respectively from the N symbol constellations;

receiving a composite symbol including a superposition of the N transmitted symbols; and demodulating the received composite symbol using the joint constellation so as to reconstruct the data transferred from the N transmitters.

There is also provided, in accordance with an embodiment of the present invention, a communication system, including:

N transmitters, $N \geq 2$, which are arranged to accept definitions of N respective symbol constellations in a signal space, defined subject to a predetermined power constraint to produce a joint constellation including superpositions of symbols selected from the N symbol constellations, and to transfer data by simultaneously transmitting N respective symbols selected respectively from the N symbol constellations; and a receiver, which is arranged to receive a composite symbol including a superposition of the N transmitted symbols, and to demodulate the received composite symbol using the joint constellation so as to reconstruct the data transferred from the N transmitters.

There is additionally provided, in accordance with an embodiment of the present invention, a communication system, including:

a first plurality of transmitters, which are arranged to accept definitions of a respective first plurality of symbol constellations in a signal space, defined so as to produce a first joint constellation including superpositions of symbols selected from the first plurality of symbol constellations, and to transfer first data by simultaneously transmitting respective first symbols selected respectively from the first plurality of symbol constellations;

a second plurality of transmitters, which are arranged to accept definitions of a respective second plurality of symbol constellations in the signal space, defined so as to produce a second joint constellation including superpositions of symbols selected from the second plurality of symbol constellations, and to transfer second data by simultaneously transmitting respective second symbols selected respectively from the second plurality of symbol constellations, wherein the first and second symbols are multiplexed over a common communication channel using a multiple access method; and a receiver, which is arranged to receive first and second composite symbols including respective superpositions of the first and second transmitted symbols, and to demodulate the first and second received composite symbols using the first and second joint constellations so as to reconstruct the first and second data transferred from the first and second pluralities of transmitters.

There is also provided, in accordance with an embodiment of the present invention, a communication system, including:

N transmitters, $N \geq 2$, which are arranged to accept definitions of N respective symbol constellations in a signal space, wherein at least one of the N symbol constellations is not a rotated and scaled replica of any other of the N symbol constellations, the symbol constellations defined so as to produce a joint constellation including superpositions of symbols selected from the N symbol constellations, and to transfer data by simultaneously transmitting N respective symbols selected respectively from the N symbol constellations; and a receiver, which is arranged to receive a composite symbol including a superposition of the N transmitted symbols, and to demodulate the received composite symbol using the joint constellation so as to reconstruct the data transferred from the N transmitters.

The present invention will be more fully understood from the following detailed description of the embodiments thereof, taken together with the drawings in which:

DETAILED DESCRIPTION OF EMBODIMENTS
SYSTEM DESCRIPTION

Figure 1:
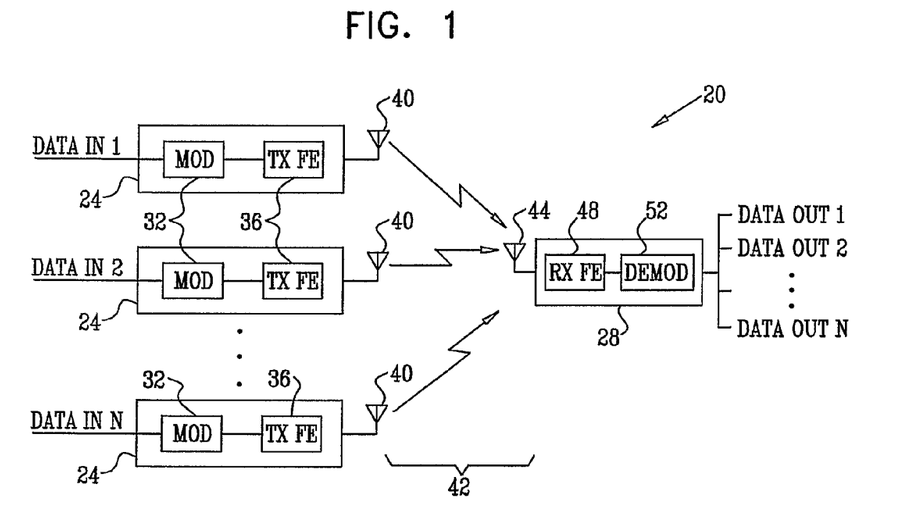
FIG. 1 is a block diagram that schematically illustrates a communication system, in accordance with an embodiment of the present invention.

FIG. 1 is a block diagram that schematically illustrates a communication system 20, in accordance with an embodiment of the present invention. System 20 comprises a multiple access system, in which multiple transmitters 24 transmit streams of data to a receiver 28. System 20 may comprise, for example, a cellular network, a wireless local area network (LAN), a satellite network, a cable communication system, or any other suitable wireless or wire-line multiple access communication system.

The number of transmitters in system 20 is denoted N. The system may comprise any number of transmitters, i.e., $N \geq 2$. The data transmitted by each transmitter 24 is typically different from the data of the other transmitters. Each transmitter 24 comprises a modulator 32, which accepts the data stream and converts it into a sequence of transmitted symbols. The transmitted symbols are selected from a dedicated symbol constellation defined for the particular transmitter in a given signal space.

Modulator 32 may encode any desired number of bits in each transmitted symbol by using a binary (1 bit per symbol), quaternary (2 bits per symbol) or any other suitable constellation size. The number of bits encoded per transmitted symbol may be different for different transmitters. The modulation is assumed to be linear. Typically, the modulator performs pulse shaping or otherwise shapes the waveform of the transmitted symbols.

System 20 uses the multiple transmitter constellations, using methods which will be explained below, to enable transmitters 24 to simultaneously transfer data to receiver 28. Methods for producing such transmitter constellations are also explained and demonstrated below.

In each transmitter 24, the transmitted symbols are processed by a transmitter front end (TX FE) 36, which performs functions such as constellation rotation and scaling, up-conversion to a suitable radio frequency, filtering and power amplification. The radio signal produced by TX FE 36 is then transmitted via a transmit antenna 40. Typically, transmitters 24 transmit on the same carrier frequency.

The N signals transmitted by transmitters 24 pass through a wireless channel 42 and are simultaneously received by receiver 28 via a receive antenna 44. (In embodiments in which system 20 comprises a wire-line system, antennas 40, channel 42 and antenna 44 are replaced by the appropriate wire-line medium and suitable transmitter and receiver channel interfaces.)

The N signals at the input of receiver 28 can be viewed as a single composite signal, which comprises a coherent superposition of the individual transmitted signals after passing channel 42, with the addition of noise and possibly other distortion elements. The composite signal is processed by a receiver front end (RX FE) 48, which performs functions such as downconversion, filtering, gain control and synchronization. The output of RX FE 48 is demodulated by a demodulator 52, often comprising a maximum likelihood detector. The demodulator typically comprises a matched filter or is otherwise matched to the waveform of the transmitted symbols. In the description that follows, the transmissions of transmitters 24 are assumed to be synchronized, so that at any given symbol interval demodulator 52 accepts a composite symbol comprising a coherent superposition of N symbols transmitted by transmitters 24.

In some embodiments, transmitters 24 may transmit on different frequencies. In these embodiments, the signals received from the transmitters are typically down-converted individually and filtered by individual matched filters.

Demodulator 52 demodulates the composite symbol to determine the N transmitted symbols (or, equivalently, to directly determine the data bits transmitted by the N transmitters) in a single demodulation step. For this purpose, the demodulator uses a joint symbol constellation based on the N transmitter constellations. In principle, the joint constellation comprises a constellation point (also called a constellation symbol) for each possible combination of N transmitted symbols, one symbol selected from each transmitter constellation. Demodulation of a single composite symbol by demodulator 52 is thus equivalent to a simultaneous demodulation of N individual symbols.

The demodulator reconstructs and outputs N data streams corresponding to the data streams provided to the N transmitters. Methods for designing joint constellations and the relationship between the joint constellation and the individual transmitter constellations used by transmitters 24 are described and demonstrated in detail below.

Figure 2:
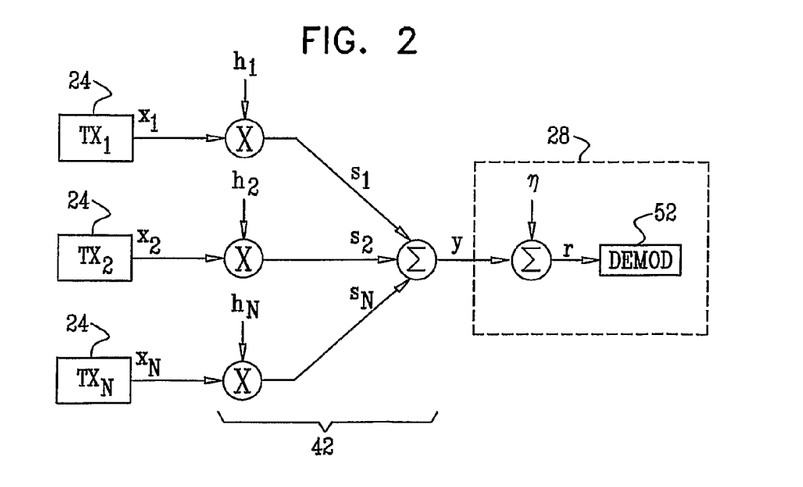
FIG. 2 is a block diagram that schematically illustrates a channel model of a communication system, in accordance with an embodiment of the present invention.

FIG. 2 is a block diagram that schematically illustrates a channel model used for representing the signals in system 20, in accordance with an embodiment of the present invention. The description that follows assumes that the response of channel 42 is substantially flat over frequency and exhibits slow temporal variations. At a particular point in time, the N transmitters transmit N symbols denoted $x_1 \ldots x_N$. Channel 42 is assumed to be a linear channel, which modifies the phase and magnitude of each transmitted signal. Thus, the output of channel 42 is given by $$y = \sum_{n=1}^{N} x_n \cdot h_n \equiv \sum_{n=1}^{N} s_n \quad [1]$$

wherein $h_n$ denotes a complex channel coefficient that multiplies the signal of the n'th transmitter. $S_n$ denotes the contribution of the n'th transmitter to the received composite symbol. The composite symbol at the input to demodulator 52 can be written as $r=y+\eta$, wherein $\eta$ denotes a complex additive Gaussian noise component having a complex Gaussian distribution. Typically, the noise is assumed to be additive white Gaussian noise (AWGN).

Transmitters 24 are assumed to control the timing, phase and power of signals $x_n$ so as to compensate for the effects of channel 42. This control can be implemented, for example, by estimating the channel coefficients $h_n$ at the receiver or by the transmitters themselves, and using these estimates to adjust the transmitted signals.

Methods for channel estimation and for transmitter control based on such estimates are well known in the art and are considered outside the scope of the present invention. For example, methods for estimation of slow, flat fading channels are described by Schwartz et al., in "Communication Systems and Techniques," McGraw-Hill, New York, 1966, chapter 9, pages 343-415, which is incorporated herein by reference. Methods for synchronization using pilot signals are described in chapter 11, pages 490-497 of this reference, which is also incorporated herein by reference. Channel estimation and synchronization is also implemented in various communication standards and protocol known in the art, such as the IEEE 802.11 and IEEE 802.16 standards.

Transmitter Constellations and Joint Receiver Constellation

Figure 6:
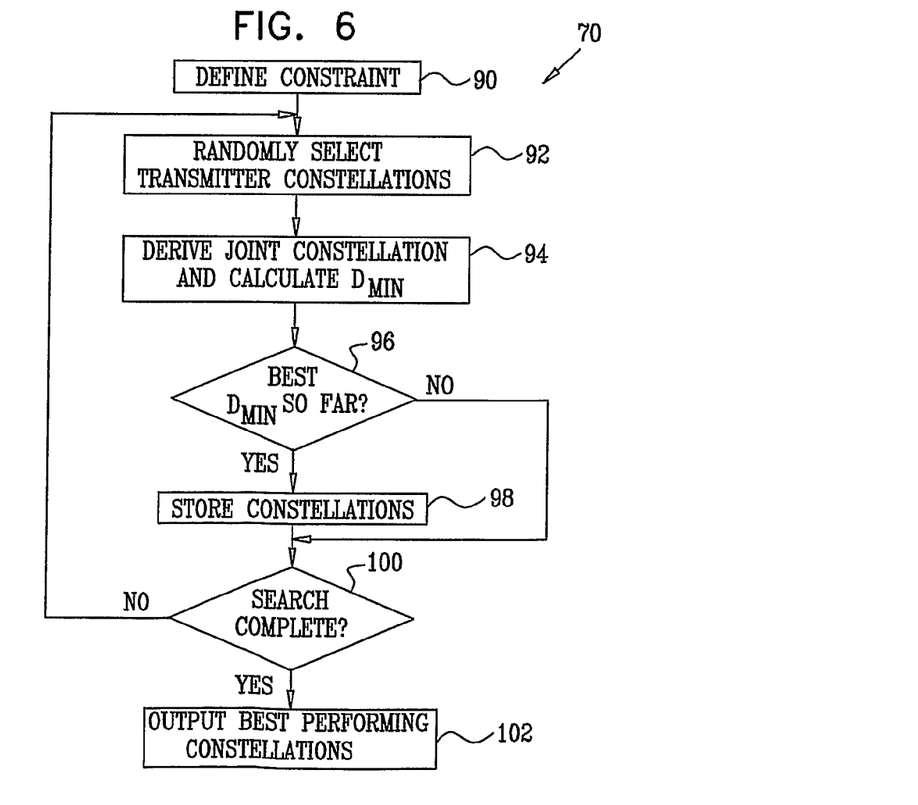
FIG. 6 is a flow chart that schematically illustrates a method for producing transmitter constellations and an associated joint constellation, in accordance with an embodiment of the present invention.

The concept of the transmitter constellations and the joint constellation used by the receiver will now be explained and demonstrated using an exemplary system configuration comprising three transmitters 24 denoted $TX_1 \ldots TX_3$. Each transmitter transmits 1 bit per symbol, i.e., uses binary modulation. The transmitter constellation of each transmitter $TX_n$, $n=1 \ldots 3$, is expressed as two complex vectors in the In-phase/Quadrature (I/Q) plane. In the present example, the following table gives the polar coordinates (i.e., the phase and magnitude of the signal vector in the I/Q plane) of the two constellation points of each of the three transmitters:

| TX\Data bit | "0" | "1" |
|---|---|---|
| $TX_1$ | $0.4085 \cdot e^{-j \cdot 1.3029}$ | $1.3539 \cdot e^{j \cdot 0.2951}$ |
| $TX_2$ | $0.9623 \cdot e^{-j \cdot 1.2935}$ | $1.0364 \cdot e^{-j \cdot 1.6968}$ |
| $TX_3$ | $0.8419 \cdot e^{-j \cdot 0.2196}$ | $1.1363 \cdot e^{j \cdot 2.9534}$ |

For example, modulator 32 of transmitter $TX_1$ selects the symbol $0.4085 \cdot e^{-j \cdot 1.3029}$ in response to a "0" data bit. Similarly, transmitter $TX_2$ selects the symbol $1.0364 \cdot e^{-j \cdot 1.6968}$ when transmitting a "1" data bit and transmitter $TX_3$ selects the symbol $0.8419 \cdot e^{-j \cdot 0.2196}$ when transmitting "0". The three transmitter constellations were produced in accordance with a random search method that is described in FIG. 6 further below.

Figure 3:
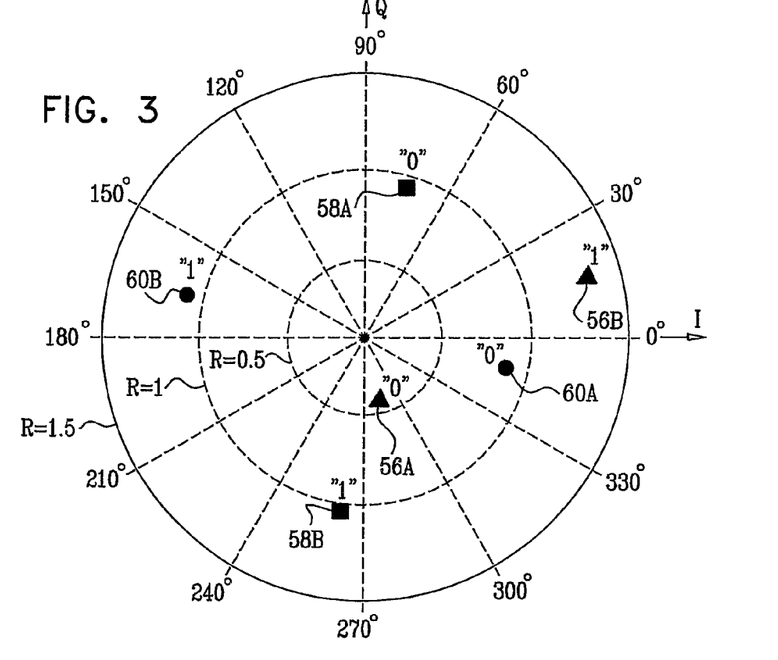
FIG. 3 is a signal space diagram showing transmitter symbol constellations, in accordance with an embodiment of the present invention.

FIG. 3 is a signal space diagram showing the three transmitter constellations described above, in accordance with an embodiment of the present invention. The figure shows the I/Q plane with a polar grid having rings at magnitudes of 0.5, 1 and 1.5. Constellation points 56A and 56B represent the vectors $0.4085 \cdot e^{-j \cdot 1.3029}$ and $1.3539 \cdot e^{j \cdot 0.2951}$, respectively, i.e., the I/Q plane coordinates of the transmitter constellation of $TX_1$. Similarly, constellation points 58A and 58B represent the transmitter constellation of $TX_2$ and constellation points 60A and 60B represent the transmitter constellation of $TX_3$.

Figure 4:
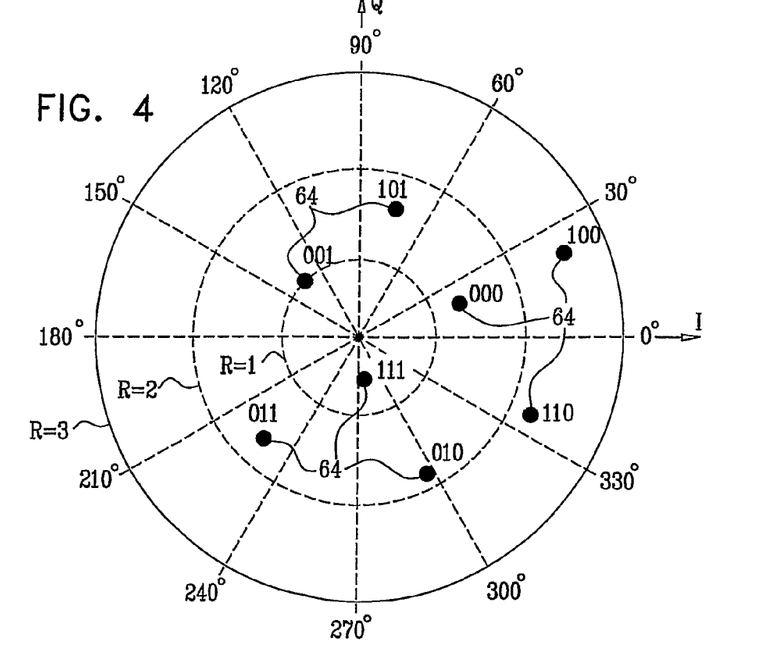
FIG. 4 is a signal space diagram showing a joint symbol constellation, in accordance with an embodiment of the present invention.

FIG. 4 is a signal space diagram showing a joint symbol constellation based on the transmitter constellations of FIG. 3 above, in accordance with an embodiment of the present invention. The figure shows eight joint constellation points 64 in the I/Q plane. Each point 64 comprises a coherent superposition of three possible transmitted symbols, one symbol selected from each of the transmitter constellations of FIG. 3.

To clarify this point, consider an exemplary scenario in which $TX_1$ transmits "0", $TX_2$ transmits "1" and $TX_3$ transmits "0". Assuming perfect channel compensation and no noise or other distortion, demodulator 52 will be provided with a coherent superposition (i.e., a vector sum) of constellation points 56A, 58B and 60A of FIG. 3 above. In other words, the demodulator will be provided with the composite symbol given by $0.4085 \cdot e^{-j \cdot 1.3029} + 1.0364 \cdot e^{-j \cdot 1.6968} + 0.8419 \cdot e^{-j \cdot 0.2196} = 1.817 \cdot e^{-j \cdot 1.1256}$, which is the polar coordinate of the joint signal point denoted "010" in FIG. 4.

Similarly, any other combination of three symbols transmitted by $TX_1 \ldots TX_3$ will result, assuming perfect channel compensation and no distortion, in a composite symbol whose polar coordinate equals one of joint constellation points 64. Since there are eight such possible combinations, the joint constellation comprises eight points. Points 64 in FIG. 4 are marked with the corresponding data bit combinations.

In some embodiments, the mapping of data bits to constellation points in the transmitter constellations is defined so as to reduce the bit error probability (BER) of the joint constellation. In particular, constellation points in the joint constellation that are adjacent to one another should be assigned with similar bit sequences, a technique commonly known as Gray coding or smart bit mapping. For example, mapping the bit sequences "111" and "000" to adjacent constellation points increases the BER, since a single symbol error causes three bit errors. On the other hand, mapping the sequences "000" and "010" to these sequences (and assigning the "111" sequence to another, more distant constellation point) reduces the BER. In the following example, however, no Gray coding is performed and the mapping of bits to symbols is arbitrary.

The exemplary system configuration and the constellations of FIGS. 3 and 4 were chosen purely for the sake of conceptual clarity. System 20 may comprise any desired number of transmitters, and each transmitter constellation may comprise any number of constellation points. Although the present example refers to constellations defined in a two-dimensional signal space (the I/Q plane), the methods described herein can be used to produce and use constellations whose signal space is one-dimensional or comprises three or more dimensions.

In most practical cases, the composite symbols provided to demodulator 52 are distorted by noise or other distortion components, such as AWGN component 77 of FIG. 2 above. In such cases, the composite symbols have polar coordinates that do not coincide with any of joint constellation points 64. The task of demodulator 52 is thus to determine which joint constellation point 64 (i.e., which set of N transmitted symbols) is most likely to have been transmitted by the N transmitters.

Several demodulator configurations can be used for this purpose. For example, a maximum likelihood (ML) detector determines the joint constellation point having the minimum Euclidean distance from the received composite symbol. For a received composite symbol r, the ML detector selects the joint constellation point having a coordinate $y_k$ that minimizes $|r-y_k|^2$ over the k points 64 of the joint constellation. A ML detector is often implemented by dividing the I/Q plane into decision regions that surround the joint constellation points, and selecting a joint constellation point according to the decision region in which the received composite symbol falls.

Based on the selected joint constellation point, demodulator 52 can determine the data bits transmitted by the N transmitters. For example, referring to FIG. 4, if the demodulator determined that the most likely composite symbol is the symbol marked "101", it concludes that in the present symbol interval transmitter $TX_1$ transmitted a "1" bit, $TX_2$ transmitted a "0" and $TX_3$ transmitted a "1". Demodulator 52 then outputs the N demodulated data bits. The demodulator operation is repeated for subsequent received composite symbols in subsequent symbol intervals, thereby reconstructing the N data streams of the N transmitters.

As can be appreciated from the above description, when the number of transmitters increases, so does the energy of the composite symbols demodulated by demodulator 52. Thus, given well-designed constellations, the error rate performance of system 20 often increases as the number of transmitters grows. This property is in contrast to some known multiple access methods in which the system performance deteriorates as the number of transmitters increases. In these known methods, the signals of the different transmitters are regarded as interfering with one another. In JCMA, the signals of all transmitters are considered desired signals that assist one another so as to improve the overall error performance of the receiver.

JCMA has an inherent resistance to eavesdropping, a property sometimes referred to as transmission security or Trans-Sec. As noted above, transmitters 24 adjust the phases and magnitudes of their signals so as to combine coherently at the location of receiver 28. An eavesdropping receiver will typically be located at a different location in space with respect to receiver 28. Therefore, the signals transmitted by transmitters 24 will typically not arrive at the eavesdropping receiver with the correct magnitudes and phases, and will not produce legitimate joint constellation symbols. Additionally or alternatively, resilience against eavesdropping can be achieved by periodically reassigning symbols among the transmitter constellations, in a manner coordinated with receiver 28.

JCMA Communication Method Descriptions

Figure 5:
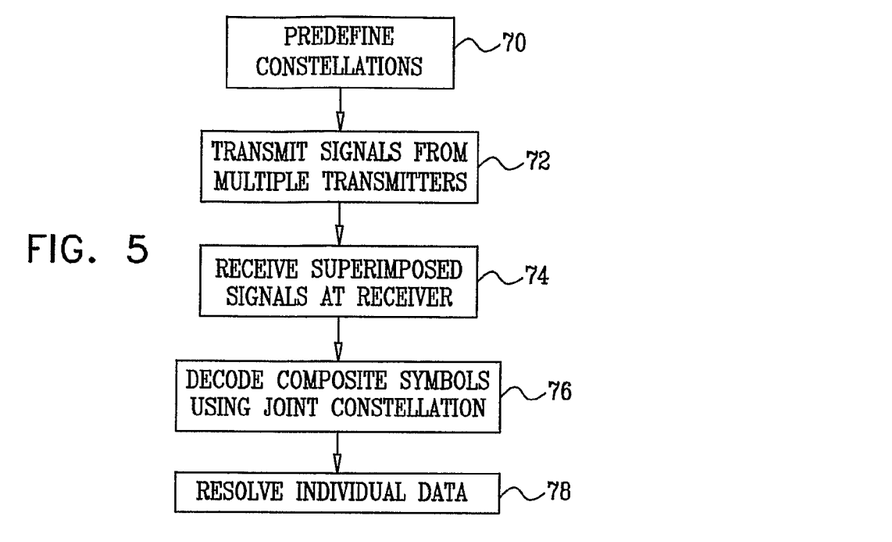
FIG. 5 is a flow chart that schematically illustrates a method for multiple access using joint constellations, in accordance with an embodiment of the present invention.

FIG. 5 is a flow chart that schematically illustrates a method for multiple access communication using joint constellations, in accordance with an embodiment of the present invention. The method begins with a system designer predefining the transmitter constellations and associated joint constellation, at a constellation definition step 70. Typically, the constellations are defined so as to maximize the minimum Euclidean distance of the joint constellation, which is defined as $$D_{MIN} = \min\{|y_i - y_j|^2\}, i \neq j \quad [2]$$

wherein $y_i$ and $y_j$ denote constellation points of the joint constellation. In some embodiments, constraints are set on the transmitter constellations, often related to the transmitted power level. For example, the instantaneous transmitted power of each transmitter 24 may be limited to a certain maximum value. Alternatively, the average power of each transmitter may not be allowed to exceed a certain value, i.e.:

$$\frac{1}{2^M} \sum_{l=1}^{2^M} |s_l^n|^2 \leq P \text{ for any } n = 1 \ldots N \quad [3]$$

wherein M denotes the number of bits per symbol used in each of the transmitter constellations, $s_l^n$ denotes the l'th constellation point of the n'th transmitter, and P denotes the average power limit. The constellations of FIGS. 3 and 4 above, as well as some of the other examples described below, were produced using this constraint. Additionally or alternatively, any other constraint may be imposed on the transmitter constellations and/or joint constellation.

In equation [3] above, all constellations are assumed to have the same number of bits per symbol, i.e., the same number of constellation symbols. In some embodiments, however, different transmitters may use constellations having different bit-per-symbol values, such as for allowing for a different Quality-of-Service (QoS) for each transmitter. In these embodiments, the number of bits per symbol of the i'th transmitter is denoted $M_i$.

After defining the constraints, the designer determines the transmitter constellations and joint constellation by applying a suitable optimization process. In principle, the optimization process attempts to find the transmitter constellation points that maximize $D_{MIN}$ of the joint constellation while meeting the constraints. Any suitable optimization method can be used for this purpose, such as, for example, various exhaustive search methods, simulated annealing methods, gradient-based methods, genetic algorithms, expectation maximization (EM) methods and combinations of such methods. An exemplary optimization process based on random generation of transmitter constellations is described in FIG. 6 below.

As demonstrated in FIG. 3 above, the optimization process usually produces N transmitter constellations having arbitrary shapes and patterns in the signal space. Typically, the transmitter constellations do not conform to a certain grid or lattice and are not scaled or rotated replicas of one another.

The N transmitters accept data and transmit N corresponding signals to receiver 28, at a transmission step 72. Each transmitter modulates its data stream and produces a respective stream of transmitted symbols, in accordance with its transmitter constellation, which was defined in step 70 above.

Receiver 28 receives the N signals, at a reception step 74. As noted above, receiver 28 coordinates the timing, phase and/or magnitude of the signals transmitted by transmitters 24, in order to compensate for the effects of channel 42. As a result, the N signals combine coherently at the receiver to form a composite symbol, in accordance with the joint constellation defined in step 70 above.

Demodulator 52 of receiver 28 demodulates the received composite symbol, at a joint demodulation step 76. The demodulator determines which of the joint constellation points is most likely to have been transmitted, given the received composite symbol. Based on the selected joint constellation point, receiver 28 reconstructs and outputs N data streams that correspond to the N data streams of the N transmitters, at a data reconstruction step 78.

It should be noted that in order to successfully demodulate the composite symbol, all N transmitted symbols should be present at the receiver. If one or more of the transmitted symbols is not transmitted or is otherwise missing from the receiver, for example because of a failure in one of the transmitters, the remaining transmitted symbols will not combine correctly in accordance with the joint constellation. A number of measures can be taken to overcome this issue. For example, a management channel or other means of exchanging management information between the transmitters and the receiver can be used to report transmitter failures to the receiver and modify the joint constellation accordingly. Alternatively, the joint constellation can be designed so as to continue providing acceptable performance in the event of transmitter failures.

FIG. 6 is a flow chart that schematically illustrates an exemplary method for producing the transmitter constellations and the associated joint constellation, in accordance with an embodiment of the present invention. This method can be used to carry out constellation definition step 70 of the method of FIG. 5 above. The constellations of FIGS. 3 and 4 above were produced using this method. Exemplary performance results of additional constellations produced using this method are provided further below.

The method begins with the designer defining a constraint on the transmitter constellations and/or joint constellation, at a constraint definition step 90. The constraint may limit, for example, the instantaneous or average power within each transmitter constellation.

A set of N transmitter constellations are generated at random, within the limits of a predefined constraint, at a transmitter constellation generation step 92. In each transmitter constellation, an appropriate number of signal space coordinates of constellation symbols are generated at random. The joint constellation resulting from these transmitter constellations is produced, at a joint constellation generation step 94. The joint constellation points are derived by scanning all possible combinations of N transmitted symbols, each symbol selected from a respective transmitter constellation. In each combination, the N symbols are combined coherently to produce a single joint constellation point. The minimal Euclidean distance ($D_{MIN}$) of the joint constellation is then calculated.

The minimal Euclidean distance is evaluated to check whether it is the best (i.e., largest) distance encountered so far, at a $D_{MIN}$ checking step 96. If the present value of $D_{MIN}$ is the best so far, the $D_{MIN}$ value and the corresponding transmitter constellations and joint constellation are temporarily stored, at a caching step 98. Otherwise, caching step 98 is skipped.

The method then checks whether the search is completed, at a completion checking step 100. In some embodiments, the search may be limited to a predetermined maximum number of iterations. In the examples described herein the search was limited to a maximum of 2000 iterations, although any other suitable limit can be used. Alternatively, any other suitable termination condition can be defined for the search.

If the search is completed, the best performing constellations stored at step 98 above are provided to the designer, at a result output step 102, and the method terminates. Otherwise, the method loops back to constellation generation step 92 above, to generate the next set of transmitter constellations.

The bit error rate (BER) performance of a particular joint constellation usually depends not only on the signal space coordinates of the joint constellation symbols, but also on the mapping of bits to those symbols. Thus, in some embodiments, the Hamming distances between symbols of the joint constellation can also be considered in addition to the Euclidean distances. For example, the search may attempt to find a joint constellation having the smallest achievable Euclidean distance, while remaining above a predefined Hamming distance threshold.

Maximum Likelihood Detector Using Joint Constellation Symmetry

When demodulator 52 comprises a maximum likelihood (ML) detector, the demodulator determines the joint constellation point whose I/Q coordinate has the smallest Euclidean distance from the I/Q coordinate of the received composite symbol. Performing this task for every received composite symbol is often computationally intensive, particularly when the joint constellation has a large number of constellation points.

Since the joint constellation is derived from a vector sum of predefined vector sets, it tends to exhibit inherent symmetries. These symmetries can sometimes be used to simplify the demodulation operation and provide a more computationally efficient ML detector. For example, consider the joint constellation of FIG. 4 above. A simplified approximation of a ML detector can be implemented by applying the following steps to each received composite symbol denoted r:

1. Rotate r by $-0.1865\cdot\pi$ radians to produce a rotated symbol denoted q, $q = r \cdot e^{-j \cdot 0.1865 \cdot \pi}$.
2. Calculate the real and imaginary components of q and of q rotated by 45° to produce $q_R = \text{real}(q)$, $q_I = \text{imag}(q)$, $u_R = \text{real}(q \cdot e^{-j\pi/4})$ and $u_I = \text{imag}(q \cdot e^{-j\pi/4})$.
3. Decode the composite symbol based on the values of $q_R$, $q_I$, $u_R$ and $u_I$ using the following table:

|  | $q_I < -1.0792$ | $-1.0792 < q_I < 0.33$ | $0.33 < q_I$ |
|---|---|---|---|
| $q_R < -0.9049$ | if($u_I < 1.978$) 010 else 011 | 011 | if($u_R < -0.9965$) 011 else 001 |
| $-0.9049 < q_R < 0.4971$ | 010 | 111 | 001 |
| $0.4971 < q_R < 1.8992$ | 110 | 000 | 101 |
| $1.8992 < q_R$ | if($u_R < 0.9965$) 110 else 100 | 100 | if($u_I < -1.978$) 100 else 101 |

The table gives the three data bits transmitted by transmitters $TX_1 \ldots TX_3$, respectively, as reconstructed by the demodulator. The present demodulator structure is shown as an example for demonstrating the use of joint constellation symmetries. In alternative embodiments, other types of symmetries in other joint constellations can be used to simplify and/or improve the efficiency of demodulator 52.

Combination of JCMA with Other Multiple Access Methods

The joint constellation multiple access methods described above can be combined with other multiple access methods, such as FDMA, TDMA and CDMA, to achieve a more efficient use of the common channel or medium.

Figure 7:
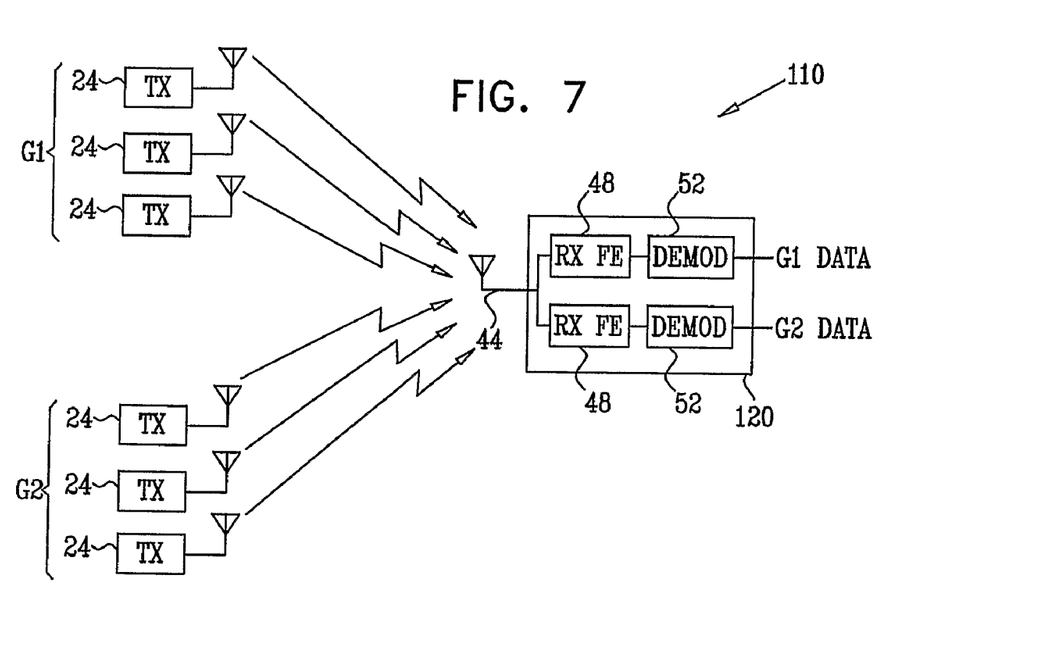
FIG. 7 is a block diagram that schematically illustrates a communication system, in accordance with another embodiment of the present invention.

FIG. 7 is a block diagram that schematically illustrates an exemplary communication system 110, in accordance with another embodiment of the present invention. In some embodiments, system 110 uses a combination of JCMA with FDMA. In these embodiments, transmitters 24 are divided into two or more groups. The transmitters belonging to a particular group transmit on a carrier frequency assigned to the group. In the example of FIG. 7, two groups denoted G1 and G2 are defined, each assigned with a dedicated carrier frequency.

A combined receiver 120 receives the transmitted signals via receive antenna 44. Receiver 120 comprises two or more receiving channels, each comprising a receiver front end and a demodulator, which are similar to RX FE 48 and demodulator 52 of FIG. 1 above, respectively. Each receiving channel processes the signals originating from the transmitters of a particular group. For example, in FIG. 7, receiver 120 comprises two receiving channels, one set to the carrier frequency of group G1 and the other set to the carrier frequency of group G2. Each receiving channel functions similarly to receiver 28 of FIG. 1 above. Different receiving channels may share common hardware, such as antenna 44 and parts of the receiver front end.

The concept of applying JCMA on separate frequency carriers can also be used in multi-carrier modulation schemes such as orthogonal frequency division multiplexing (OFDM). JCMA can be applied to each sub-carrier of an OFDM signal to increase its spectral efficiency.

In alternative embodiments, system 110 combines JCMA with TDMA. In these embodiments, transmitters 24 are divided into two or more groups, and each group is assigned a particular time slot in a time division multiplexing frame. The transmitters of a particular group (i.e., the transmitters transmitting during a particular time slot) are multiplexed using JCMA, in accordance with the method of FIG. 5 above. The receiver used in these embodiments may comprise a single-channel receiver such as receiver 28 of FIG. 1 above, which processes all time slots in alternation. Alternatively, a multiple-channel receiver such as receiver 120 can be used, with each receiving channel processing one or more of the time slots.

Further alternatively, system 110 may combine JCMA with CDMA. In these embodiments, the transmitters are divided into two or more groups, each group using a different CDMA code or sequence. Each receiving channel in receiver 120 comprises a spread-spectrum receiver as is known in the art, which is matched to the CDMA code of a particular group. In some cases, the receiver front end and possibly some of the demodulator may be common to all receiving channels.

Additionally or alternatively, JCMA can be combined with any other suitable multiple access method. Some exemplary multiple access methods are described by Rappaport in "Wireless Communications," Prentice Hall, 1996, chapter 8, pages 395-437, which is incorporated herein by reference.

Exemplary Performance Results

The performance of the exemplary system configuration described above, having the constellations of FIGS. 3 and 4, was compared against a reference TDMA system with three transmitters occupying the same bandwidth (i.e., same symbol rate). Each TDMA transmitter is assigned a dedicated time slot and is active for a third of the time. In order to perform a fair comparison, each TDMA transmitter uses three bits per symbol, so that equal data rates are transmitted. The modulation scheme chosen for the TDMA transmitters is 8-ary quadrature-amplitude (8-QAM) modulation with unit energy per symbol. Arbitrary bit mapping is used.

In the reference system, the receiver demodulates the signal from one transmitter in each 33% time slot. In the JCMA system, the receiver receives and demodulates the data of all three transmitters simultaneously using the joint constellation of FIG. 4 above.

Figure 8:
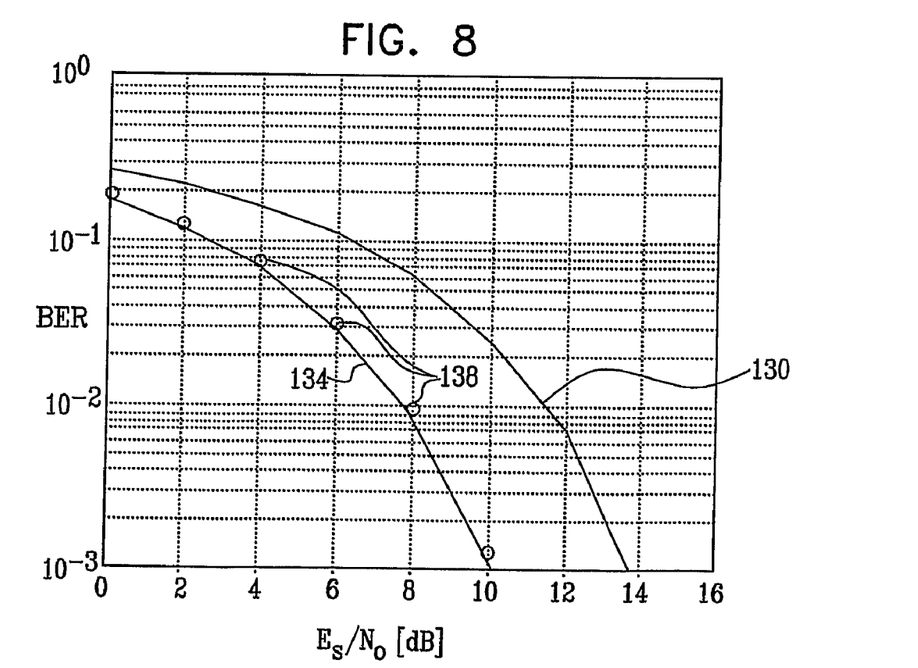
FIGS. 8 and 9 are graphs showing simulated performance results of joint constellation multiple access (JCMA) systems, in accordance with embodiments of the present invention.

FIG. 8 is a graph showing simulated BER performance of the exemplary JCMA system in comparison with the reference TDMA system, in accordance with an embodiment of the present invention. A plot 130 shows the BER of the reference TDMA system as a function of symbol energy normalized by the thermal noise density ($E_s/N_0$). A plot 134 and data points 138 show the BER of the JCMA system as a function of $E_s/N_0$. Plot 134 shows the BER achieved by an exhaustive ML detector. Data points 138 show the performance of the higher efficiency, symmetry-based ML detector described above. As can be seen in the figure, the performance of the efficient ML detector is only negligibly inferior to the performance of the higher complexity, exhaustive detector.

The plots show that the performance gain of the JCMA system over the TDMA system increases as $E_s/N_0$ increases. For BER=$10^{-3}$, JCMA offers approximately 4 dB gain over TDMA. For $E_s/N_0$=10 dB, JCMA provides BER=$10^{-3}$ while TDMA achieves only $2.5 \cdot 10^{-2}$. Note that the overall energy transmitted in the JCMA system is 3 times greater than the energy of the TDMA system, while still meeting the power constraint of each transmitter. The performance gain can be used to provide better error performance for a given signal-to-noise ratio, or to enable a lower transmitter power or a greater communication distance for a given target BER.

As noted above, the performance gain offered by the JCMA methods described herein increases with the number of transmitters in the system. One possible figure-of-merit that can be used for quantifying this performance gain is the minimal Euclidean distance ($D_{MIN}$) of the joint constellation, since larger $D_{MIN}$ values directly translate to lower BER.

Figure 9:
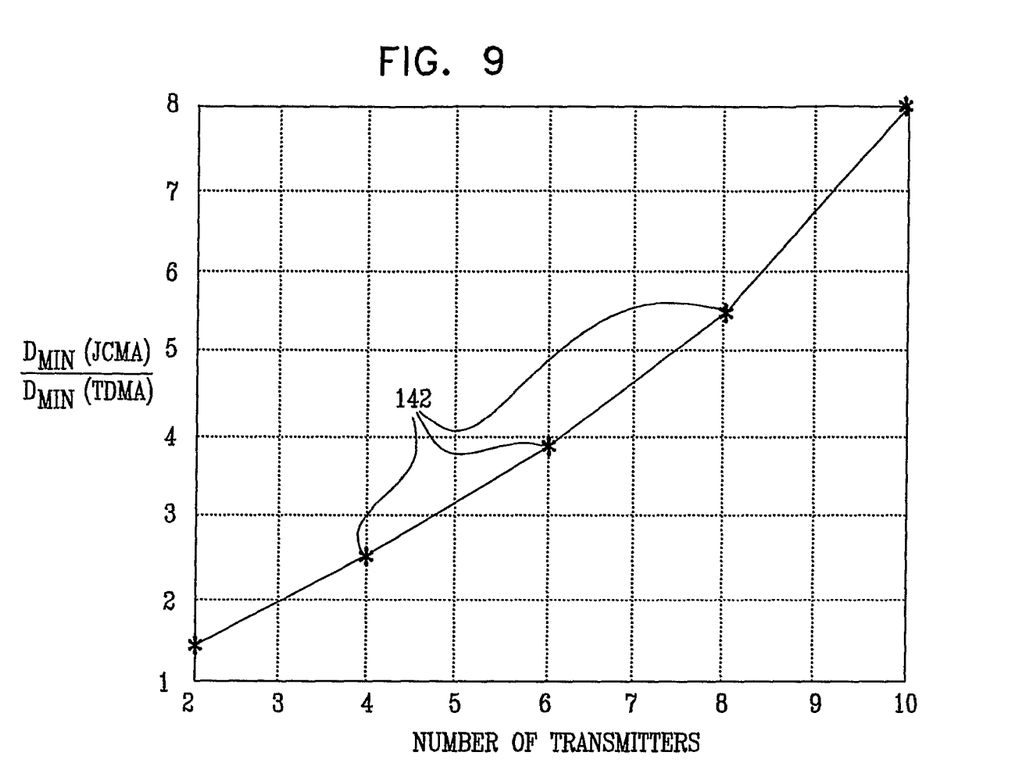

FIG. 9 is a plot showing a simulated comparison of minimal Euclidean distance ($D_{MIN}$) values between JCMA and TDMA systems as a function of the number of transmitters denoted N. Data points 142 show the ratio between $D_{MIN}$ of the joint constellation of an N-transmitter JCMA system and between the $D_{MIN}$ of a comparable N-transmitter TDMA system.

For each value of N, the random search method of FIG. 6 above was used to produce transmitter constellations and a joint constellation under the individual transmitter power constrains of equation [3] above. The TDMA system used $2^N$-QAM constellations. As can be seen, the gain in $D_{MIN}$ grows sharply with the number of transmitters.

Configurations with Unequal Transmitter Properties

In some cases it may be desirable to configure different transmitters 24 to have different data rates. For example, quality of service (QoS) requirements may require that two transmitters operate at different bit rates but have similar bit error rates (BER). In order to provide this capability, in some embodiments, the size of the transmitter constellation may differ from one transmitter to another.

For example, in a system comprising two transmitters, the random search method of FIG. 6 was used to produce two transmitter constellations. The first constellation has two transmitted symbols and the second has four symbols, enabling twice the data rate of the first transmitter. The individual power constraint of [3] was used in the search. The determined transmitter constellations are shown in the following table:

| | | |
|---|---|---|
| $TX_1$ | $1.0676 \cdot e^{j \cdot 2.2587}$ | $0.9275 \cdot e^{-j \cdot 1.1795}$ |
| $TX_2$ | $1.0971 \cdot e^{-j \cdot 0.0002}$ | $1.14373 \cdot e^{-j \cdot 2.964}$ |
| | $0.4882 \cdot e^{j \cdot 1.5367}$ | $0.7016 \cdot e^{-j \cdot 1.6711}$ |

Simulation results show that the JCMA configuration described above achieves approximately 3 dB gain at $BER=10^{-3}$ in comparison with an 8-ary phase shift keying (8-PSK) TDMA reference system. Smart bit mapping may increase this gain up to ~4 dB at low signal to noise ratios.

Additionally or alternatively, in some cases different transmitters are received by receiver 28 at different power levels. For example, some transmitters may be more distant than others beyond the capability of the transmitters to compensate for this difference using power control.

A JCMA configuration of two unequal power transmitters was simulated and compared with a comparable TDMA configuration. In both systems, one transmitter was subjected to a channel having twice the attenuation in comparison with the channel of the other transmitter. As a result, the signal transmitted by one transmitter reaches the receiver at half the power of the signal transmitted by the other transmitter. The random search method of FIG. 6 above, with the constraint of equation [3] above (modified to accommodate the 1:2 power ratio), provided the following transmitter constellations:

| | | |
|---|---|---|
| $TX_1$ | $1.1148 \cdot e^{-j \cdot 0.5953}$ | $0.8703 \cdot e^{j \cdot 2.7616}$ |
| $TX_2$ | $0.707 \cdot e^{-j \cdot 0.7333}$ | $0.7072 \cdot e^{-j \cdot 2.408}$ |

The TDMA transmitters of the reference system used quaternary PSK (QPSK) modulation. Gray coding was used in both systems. Simulation BER results show that both transmitters of the JCMA system perform similarly to the strong TDMA transmitter. The weaker TDMA transmitter was inferior by ~2.5-3 dB for the same BER.

In effect, the stronger transmitter assists the demodulation of the weaker transmitter by contributing its signal energy to the composite symbol. The case of two transmitters having significantly unequal power levels is typical of a scenario in which one transmitter relays the information of another transmitter located further away from the receiver. Unlike known cooperative transmit diversity methods, in JCMA the closer transmitter does not compromise its performance in the process. Thus, JCMA can be used to implement cooperative transmit diversity efficiently.

Assigning different power levels to different transmitter constellations can also be used to resolve "near-far" problems, which are frequently encountered in multiple access systems, particularly in CDMA systems.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
    defining N respective symbol constellations in a signal space for N transmitters, subject to a predetermined power constraint, so as to produce a joint constellation comprising superpositions of symbols selected from the N symbol constellations;
    transferring data from the N transmitters by transmitting from the N transmitters N respective symbols selected respectively from the N symbol constellations;
    receiving a composite symbol comprising a superposition of the N transmitted symbols arriving simultaneously at a receiver; and
    demodulating the received composite symbol using the joint constellation so as to reconstruct the data transferred from the N transmitters.

2. The method according to claim 1, wherein defining the N symbol constellations comprises applying an optimization process responsively to the power constraint.

3. The method according to claim 2, wherein applying the optimization process comprises repeatedly generating random sets of the N transmitter constellations, evaluating a minimum Euclidean distance ($D_{MIN}$) value of the produced joint constellation, and outputting a set of N transmitter constellations and joint constellation corresponding to a largest $D_{MIN}$ value.

4. The method according to claim 3, wherein applying the optimization process comprises evaluating Hamming distances of the produced joint constellation, and wherein outputting the set of N transmitter constellations and the joint constellation comprises verifying that the joint constellation has a minimal Hamming distance larger than a predefined threshold.

5. The method according to claim 1, wherein defining the N symbol constellations comprises maximizing distances in the signal space among joint constellation symbols of the joint constellation.

6. The method according to claim 1, wherein defining the N symbol constellations comprises defining for a first transmitter a first symbol constellation having a first number of constellation symbols, and defining for a second transmitter a second symbol constellation having a second number of constellation symbols different from the first number, so as to cause the first and second transmitters to transmit the data at different respective data rates.

7. The method according to claim 1, wherein defining the N symbol constellations comprises defining first and second power levels of respective first and second symbol constellations of first and second transmitters, so as to cause first and second symbols transmitted respectively by the first and second transmitters to be received at different power levels.

8. The method according to claim 1, wherein the power constraint comprises a maximum value set to at least one of an instantaneous power and an average power of each of the N transmitters.

9. The method according to claim 1, wherein transferring the data from the N transmitters comprises adjusting at least one of phases, magnitudes and timing offsets of the symbols transmitted from the N transmitters so as to produce the composite symbol.

10. The method according to claim 1, wherein demodulating the received composite symbol comprises selecting a symbol from among joint constellation symbols of the joint constellation responsively to the received composite symbol using a maximum likelihood (ML) detector.

11. The method according to claim 10, wherein demodulating the received composite symbol comprises approximating the ML detector based on a symmetry of the joint constellation.

12. The method according to claim 1, and comprising modifying at least one of the joint constellation and the N symbol constellation responsively to a failure of one or more of the N transmitters.

13. The method according to claim 1, and comprising periodically redefining the N symbol constellations by re-assigning the symbols among the N symbol constellations.

14. The method according to claim 1, wherein defining the N symbol constellations comprises defining a first plurality of the symbol constellations corresponding to a first plurality of the transmitters so as to produce a first joint constellation comprising superpositions of the symbols selected from the first symbol constellations, and a second plurality of the symbol constellations corresponding to a second plurality of the transmitters so as to produce a second joint constellation comprising superpositions of the symbols selected from the second symbol constellations, wherein transferring the data comprises transmitting from the first plurality of transmitters first respective symbols selected respectively from the first plurality of symbol constellations, and transmitting from the second plurality of transmitters second respective symbols selected respectively from the second plurality of symbol constellations and multiplexing the first and second symbols over a common communication channel using a multiple access method, and wherein receiving the composite symbol comprises receiving first and second composite symbols comprising respective superpositions of the first and second transmitted symbols each arriving simultaneously at a receiver, and wherein demodulating the received composite symbol comprises demodulating the first and second received composite symbols using the first and second joint constellations so as to reconstruct the data transferred from the first and second pluralities of transmitters.

15. The method according to claim 14, wherein the multiple access method comprises a frequency division multiple access (FDMA) method, and wherein multiplexing the first and second symbols comprises transmitting the first and second symbols on respective different first and second carrier frequencies.

16. The method according to claim 14, wherein the multiple access method comprises a time division multiple access (TDMA) method, and wherein multiplexing the first and second symbols comprises transmitting the first and second symbols in respective different first and second time slots.

17. The method according to claim 14, wherein the multiple access method comprises a code division multiple access (CDMA) method, and wherein multiplexing the first and second symbols comprises transmitting the first and second symbols using respective different first and second CDMA sequences.

18. The method according to claim 14, wherein the multiple access method comprises orthogonal frequency division multiplexing (OFDM), and wherein multiplexing the first and second symbols comprises transmitting the first and second symbols on respective first and second OFDM sub-carriers of an OFDM signal.

19. A method for communication, comprising:

defining N respective symbol constellations in a signal space for N transmitters, $N \geq 2$, so as to produce a joint constellation comprising superpositions of symbols selected from the N symbol constellations, wherein at least one of the N symbol constellations is not a rotated and scaled replica of any other of the N symbol constellations;

transferring data from the N transmitters by transmitting from the N transmitters N respective symbols selected respectively from the N symbol constellations;

receiving a composite symbol comprising a superposition of the N transmitted symbols arriving simultaneously at a receiver; and demodulating the received composite symbol using the joint constellation so as to reconstruct the data transferred from the N transmitters.

20. A communication system, comprising:

N transmitters, $N \geq 2$, which are arranged to accept definitions of N respective symbol constellations in a signal space, defined subject to a predetermined power constraint to produce a joint constellation comprising superpositions of symbols selected from the N symbol constellations, and to transfer data by transmitting N respective symbols selected respectively from the N symbol constellations; and a receiver, which is arranged to receive a composite symbol comprising a superposition of the N transmitted symbols arriving simultaneously at the receiver, and to demodulate the received composite symbol using the joint constellation so as to reconstruct the data transferred from the N transmitters.

21. The system according to claim 20, wherein the N symbol constellations are defined by applying an optimization process responsively to the power constraint.

22. The system according to claim 21, wherein the optimization process comprises repeatedly generating random sets of the N transmitter constellations, evaluating a minimum Euclidean distance ($D_{MIN}$) value of the produced joint constellation, and outputting a set of N transmitter constellations and joint constellation corresponding to a largest $D_{MIN}$ value.

23. The system according to claim 22, wherein the optimization process further comprises evaluating Hamming distances of the produced joint constellation, and outputting a set of N transmitter constellations and joint constellation having a minimal Hamming distance larger than a predefined threshold.

24. The system according to claim 20, wherein the N symbol constellations are defined so as to maximize distances in the signal space among joint constellation symbols of the joint constellation.

25. The system according to claim 20, wherein a first symbol constellation out of the N symbol constellations has a first number of constellation symbols, and wherein a second symbol constellation out of the N symbol constellations has a second number of constellation symbols different from the first number, so that respective first and second transmitters transmit the data at different respective data rates.

26. The system according to claim 20, wherein first and second transmitters out of the N transmitters are arranged to transmit at respective first and second power levels, so as to cause first and second symbols transmitted respectively by the first and second transmitters to be received by the receiver at different power levels.

27. The system according to claim 20, wherein the power constraint comprises a maximum value set to at least one of an instantaneous power and an average power of each of the N transmitters.

28. The system according to claim 20, wherein the N transmitters are arranged to adjust at least one of phases, magnitudes and timing offsets of the symbols transmitted from the N transmitters so as to produce the composite symbol.

29. The system according to claim 20, wherein the receiver comprises a maximum likelihood (ML) detector, which is arranged to demodulate the received composite symbol by selecting a symbol from among joint constellation symbols of the joint constellation responsively to the received composite symbol.

30. The system according to claim 29, wherein the ML detector comprises an approximated ML detector based on a symmetry of the joint constellation.

31. The system according to claim 20, wherein the N transmitters and the receiver are arranged to modify at least one of the joint constellation and the N symbol constellation responsively to a failure of one or more of the N transmitters.

32. The system according to claim 20, wherein the transmitters and the receiver are arranged to periodically redefine the N symbol constellations by re-assigning the symbols among the N symbol constellations.

33. The system according to claim 20, wherein the transmitters comprise
a first plurality of the transmitters, which are arranged to accept definitions of a respective first plurality of the symbol constellations, defined so as to produce a first joint constellation comprising superpositions of the symbols selected from the first plurality of the symbol constellations, and to transfer a first portion of the data by transmitting respective first symbols selected respectively from the first plurality of symbol constellations,
wherein the transmitters further comprise:
a second plurality of the transmitters, which are arranged to accept definitions of a respective second plurality of the symbol constellations, defined so as to produce a second joint constellation comprising superpositions of the symbols selected from the second plurality of the symbol constellations, and to transfer a second portion of the data by transmitting respective second symbols selected respectively from the second plurality of symbol constellations, wherein the first and second symbols are multiplexed over a common communication channel using a multiple access method, and wherein the
a receiver is arranged to receive at least one of the first and second composite symbols each comprising respective superpositions of the first and second transmitted symbols arriving simultaneously at the receiver, and to demodulate the at least one composite symbols using at least one of the first and second joint constellations so as to reconstruct at least one of the first and second portions of the data transferred from the first and second pluralities of transmitters.

34. The system according to claim 33, wherein the multiple access method comprises a frequency division multiple access (FDMA) method, and wherein the first and second pluralities of the symbols are multiplexed by transmitting the first and second pluralities of the symbols on respective different first and second carrier frequencies.

35. The system according to claim 33, wherein the multiple access method comprises a time division multiple access (TDMA) method, and wherein the first and second pluralities of the symbols are multiplexed by transmitting the first and second pluralities of the symbols in respective different first and second time slots.

36. The system according to claim 33, wherein the multiple access method comprises a code division multiple access (CDMA) method, and wherein the first and second pluralities of the symbols are multiplexed by transmitting the first and second pluralities of the symbols using respective different first and second CDMA sequences.

37. The system according to claim 33, wherein the multiple access method comprises orthogonal frequency division multiplexing (OFDM), and wherein the first and second pluralities of the symbols are multiplexed by transmitting the first and second pluralities of the symbols on respective first and second OFDM sub-carriers of an OFDM signal.

38. A communication system, comprising:
N transmitters, $N \geq 2$, which are arranged to accept definitions of N respective symbol constellations in a signal space, wherein at least one of the N symbol constellations is not a rotated and scaled replica of any other of the N symbol constellations, the symbol constellations defined so as to produce a joint constellation comprising superpositions of symbols selected from the N symbol constellations, and to transfer data by transmitting N respective symbols selected respectively from the N symbol constellations; and
a receiver, which is arranged to receive a composite symbol comprising a superposition of the N transmitted symbols arriving simultaneously at the receiver, and to demodulate the received composite symbol using the joint constellation so as to reconstruct the data transferred from the N transmitters.

39. A communication device, comprising:
a modulator, which is coupled to accept a definition of one of a plurality of symbol constellations in a signal space, wherein the plurality of symbol constellations is defined subject to a predetermined power constraint to produce a joint constellation of composite symbols such that each of the composite symbols comprises a superposition of symbols respectively selected from the symbol constellations in the plurality, and to convert data into a symbol selected from the one of the plurality of symbol constellations; and
a transmitter front-end, which is coupled to transmit the symbol to a receiver, so as to cause the symbol to arrive at the receiver simultaneously with at least another symbol from another one of the plurality of symbol constellations transmitted by another communication device, to produce a composite symbol at the receiver.

40. The device according to claim 39, wherein the composite symbol and at least one other composite symbol are multiplexed over a common communication channel using a multiple access method.

41. The device according to claim 39, wherein the modulator is coupled to accept a plurality of predefined symbol constellations and a selection of the one of the plurality of symbol constellations.

42. The device according to claim 39, wherein the power constraint comprises a maximum value set to at least one of an instantaneous transmission power and an average transmission power.

43. The device according to claim 39, wherein the modulator is coupled to adjust at least one of a phase, a magnitude and a timing offset of the symbol so as to produce the composite symbol.

44. A communication device, comprising:
- a receiver front-end, which is coupled to receive a composite symbol from among a constellation of composite symbols, wherein each of the composite symbols comprises a superposition of symbols respectively selected from a plurality of symbol constellations in a signal space and transmitted by one of a respective plurality of transmitters, and wherein the plurality of symbol constellations is defined subject to a predetermined power constraint to produce the joint constellation; and
- a demodulator, which is coupled to accept a definition of the joint constellation, and to demodulate the received composite symbol so as to reconstruct data transferred from at least one of the plurality of transmitters.

45. The device according to claim 44, wherein the composite symbol and at least one other composite symbol are multiplexed over a common communication channel using a multiple access method.

46. The device according to claim 44, wherein the demodulator is coupled to select a joint constellation from a plurality of joint constellations.

47. The device according to claim 44, wherein the demodulator is coupled to select at least one of:
- a joint constellation from a plurality of joint constellations, and
- respective symbol constellations for at least some of the transmitters,
- by applying an optimization process responsively to the power constraint.

48. The device according to claim 47, wherein the optimization process comprises repeatedly receiving random sets of symbol constellations, evaluating a minimum Euclidean distance ($D_{MIN}$) value of the produced joint constellation, and outputting a set of symbol constellations and joint constellation corresponding to a largest $D_{MIN}$ value.

49. The device according to claim 47, wherein the optimization process further comprises evaluating Hamming distances of the produced joint constellation, and outputting a set of symbol constellations and joint constellation having a minimal Hamming distance larger than a predefined threshold.

50. The device according to claim 47, wherein the symbol constellations are defined so as to maximize distances in the signal space among joint constellation symbols of the joint constellation.

51. The device according to claim 44, wherein the demodulator is coupled to demodulate the received composite symbol using a first symbol constellation having a first number of constellation symbols, and a second symbol constellation having a second number of constellation symbols different from the first number, so as to reconstruct data transferred from respective first and second transmitters at different respective data rates.

52. The device according to claim 44, wherein the demodulator is coupled to demodulate first and second symbols transmitted respectively by first and second transmitters and received by the receiver at different power levels.

53. The device according to claim 44, wherein the power constraint comprises a maximum value set to at least one of an instantaneous power and an average power of each of the plurality of transmitters.

54. The device according to claim 44, wherein the demodulator comprises a maximum likelihood (ML) detector, which is arranged to demodulate the received composite symbol by selecting a joint constellation symbol from among joint constellation symbols of the joint constellation responsively to the received composite symbol.

55. The device according to claim 54, wherein the ML detector comprises an approximated ML detector based on a symmetry of the joint constellation.

56. A method for secure communication, comprising:
- defining N respective symbol constellations in a signal space for N transmitters, $N \geq 2$, subject to a predetermined power constraint, so as to produce a joint constellation comprising superpositions of symbols selected from the N symbol constellations;
- transferring secure data from one of the transmitters and other data from the other N−1 transmitters by transmitting from the N transmitters N respective symbols selected respectively from the N symbol constellations;
- receiving a composite symbol comprising a superposition of the N transmitted symbols arriving simultaneously at a receiver; and
- demodulating the received composite symbol using the joint constellation so as to reconstruct the secure data.

57. A communication system, comprising:
- N transmitters, $N \geq 2$, which are arranged to accept definitions of N respective symbol constellations in a signal space, defined subject to a predetermined power constraint to produce a joint constellation comprising superpositions of symbols selected from the N symbol constellations, and to transfer a secure data symbol from one of the transmitters and N−1 respective other symbols from the other transmitters, respectively selected from the N symbol constellations; and
- a receiver, which is arranged to receive a composite symbol comprising a superposition of the N transmitted symbols arriving simultaneously at the receiver, and to demodulate the received composite symbol using the joint constellation so as to reconstruct the secure data symbol.

* * * * *